Figure 1:
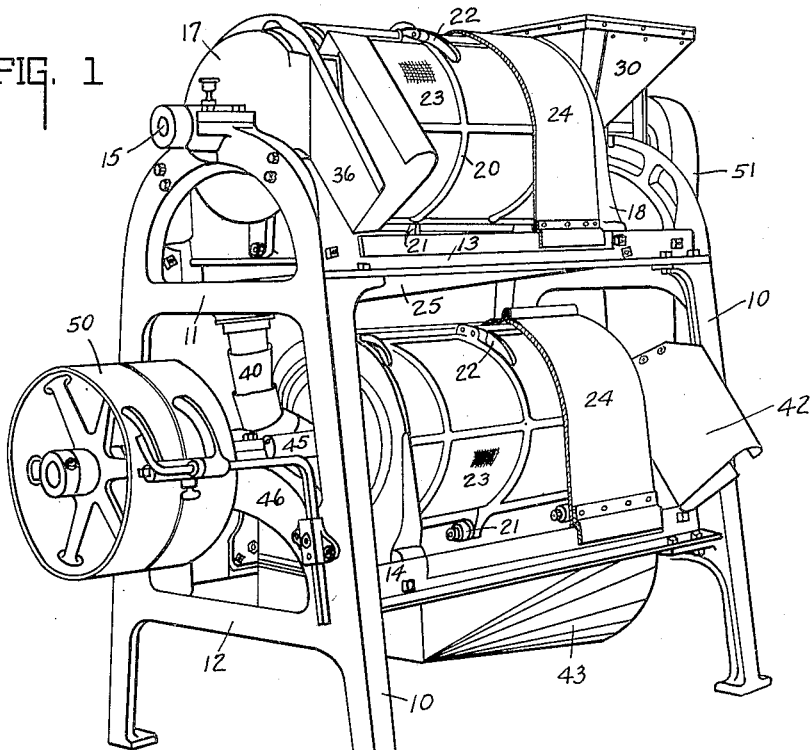

Oct. 14, 1924.　　　　　　　　　　　　　　　　　　1,511,288
J. F. LINDLEY
TOMATO PULPER AND SEED EXTRACTOR
Filed April 28, 1923　　2 Sheets-Sheet 1

INVENTOR.
JAMES F. LINDLEY.
BY
Lockwood & Lockwood
ATTORNEYS.

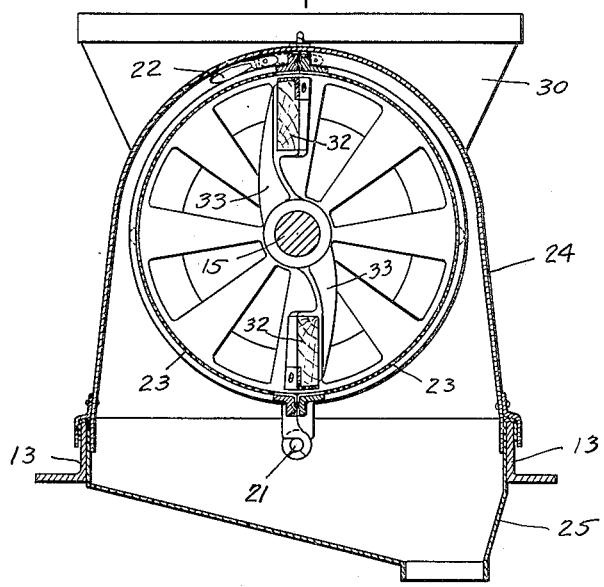
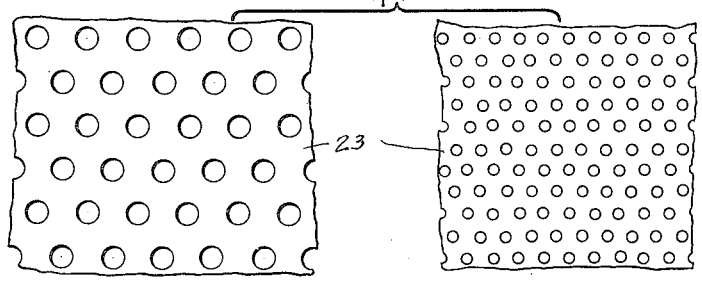
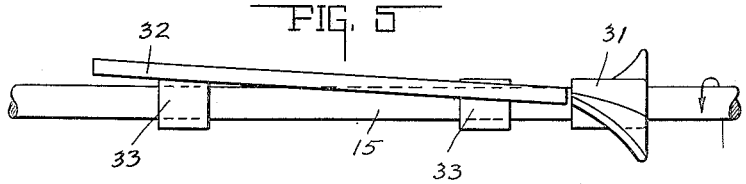

Patented Oct. 14, 1924.

1,511,288

UNITED STATES PATENT OFFICE.

JAMES F. LINDLEY, OF INDIANAPOLIS, INDIANA, ASSIGNOR TO INDIANA CANNING MACHINERY COMPANY, OF INDIANAPOLIS, INDIANA, A CORPORATION.

TOMATO PULPER AND SEED EXTRACTOR.

Application filed April 28, 1923. Serial No. 635,216.

*To all whom it may concern:*

Be it known that I, JAMES F. LINDLEY, a citizen of the United States, and a resident of Indianapolis, county of Marion, and State of Indiana, have invented a certain new and useful Tomato Pulper and Seed Extractor; and I do hereby declare that the following is a full, clear, and exact description thereof, reference being had to the accompanying drawings, in which like numerals refer to like parts.

The object of this invention primarily is to provide a single machine for successively different treatments of tomatoes and the like, and preferably treatments wherein the tomato material is more and more refined and reduced by the successive cylinders in the machine. Another object of the invention is the extraction of seeds from tomatoes and the like while they are being pulped.

One feature of the invention is the compound character of the machine, whereby in a single machine tomatoes and the like may be successively but differently treated in pulping or seeding the same, or making catsup, soup stock or the like. In the successive treatments in said machine, the tomatoes are successively reduced to a finer constituency. The machine herein shown, which is termed a "tomato seeder," has a beating cylinder in the upper part of the machine for coarsely treating the tomatoes and the like and separating therefrom the cores and skin. The relatively coarse material coming from the first cylinder, free from cores and skin, passes down to a cylinder below in which it is further treated for refining the product and also separating the seeds therefrom.

To accomplish the objects of the invention, the component parts of said machine have various structural characteristics. The screen in the upper cylinder has relative larger perforations than the lower cylinder. The upper cylinder has a relatively small throat, but with a small impeller therein to handle the mass of large tomatoes or material coming from the hopper and force it through the machine rapidly. The beaters in said upper cylinder are also inclined to facilitate the separation of the skin and cores and discharging the same at the rear end of the cylinder.

The lower cylinder needs no impeller in the throat because the material coming through it is comminuted and largely liquefied, but it is still desirable to have inclined beaters to facilitate the movement and separation of the seeds and their discharge at the end of the machine. In the upper cylinder the beaters do not approach relatively close to the screen because it is not desired to comminute the material too much, but rather pass it through in partially treated and small chunk form. Also in the lower cylinder the beaters are not very close to the screen when it is desired to extract the seeds.

Figure 2:
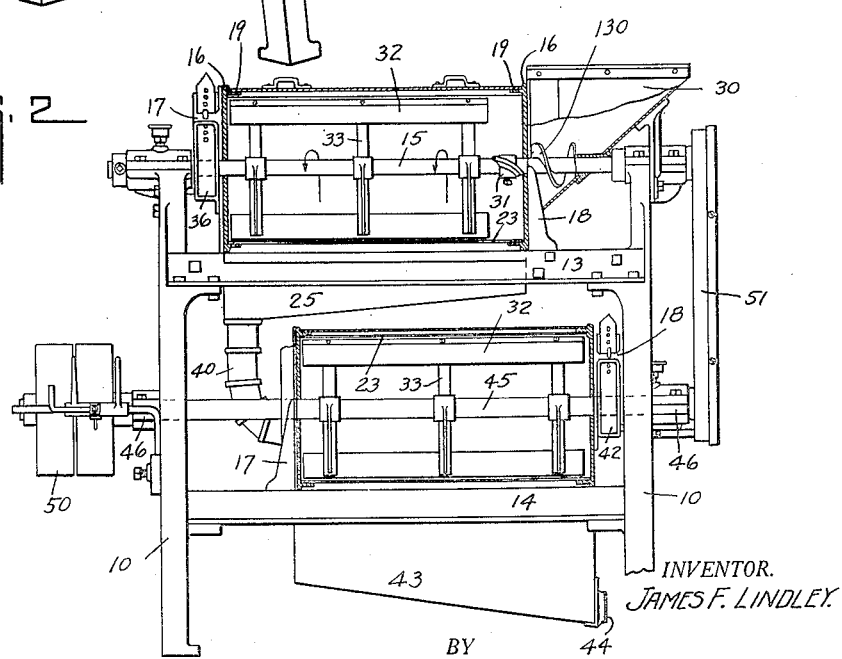

The full nature of the invention will be understood from the accompanying drawings and the following description and claims:

In the drawings, Figure 1 is a perspective view of the machine with parts of the cylinder casings broken away. Fig. 2 is a central vertical longitudinal section through the machine. Fig. 3 is a vertical transverse section of the upper beater and drain pan, parts being broken away. Fig. 4 shows in elevation portions of the screens in the upper and lower cylinders, on an enlarged scale, to indicate the relative mesh or size of the perforations. Fig. 5 is a plan view of the shaft of the upper cylinder with the impeller and one of the beaters in plan view, the shaft being broken away at its ends, and showing the inclined portion of the beater.

The supporting frame work of the machine consists substantially of the end frames 10 which are formed of vertical side leg supports and curved upper end and cross bars 11 and 12. The end frames are connected by the upper side bars 13 and lower side bars 14, as shown in Fig. 1.

In the curved upper part of the end frames the shaft 15 of the upper cylinder is mounted, as shown in Figs. 1 and 2. Said shaft extends concentrically through two cylinder end plates 16 which are stationary and secured to the frame members 17 and 18 which are fastened on the main frame. Said plates 16 have inwardly extending annular flanges 19 on the outside. Semi-circular cylinder frames 20 rest on said flanges 19 and are hinged together on the lower side by hinges 21 and are clamped together at the upper side by fasteners 22. On the inside of each semi-circular cylinder frame 20 there is secured removably a semi-circular perforated plate or screen 23 and on the outside of said cylinder frame there is placed a readily removable casing 24. The screens 23 in the machine shown, which is a seeder, have relatively coarse mesh or perforations sufficient to admit relatively coarse lumpy material to pass through the same. That is, the perforations in the upper cylinder are, say, five-thirty-seconds of an inch, or larger than those in the usual machine for pulping tomatoes or making catsup. The tomato material is forced through the screens into the pan or receiving chamber 25 under the upper cylinder, as seen in Fig. 2.

There is a hopper 30 at one end of the machine with its bottom inclined downward and inward so as to convey the tomatoes, which previously are usually washed, steamed or cooked, to the cylinder. In the lower part of the hopper the shaft carries a screw 130 for forcing the tomatoes into the cylinder. In the throat of the cylinder at the inlet from the hopper, there is an impeller 31 on the shaft 15. This is for the purpose of receiving the coarse tomatoes or tomato material from the hopper and forcibly and readily feeding it through the cylinder. Within the cylinder there are beaters 32, two of them in the upper cylinder shown herein and each beater is mounted on arms 33 extending radially in spider form from the shaft on which said arms are secured. The arms are so arranged as to hold the beaters in this machine a little farther away from the screen or cylinder than has been customary in pulping machines heretofore used; and also the beaters are inclined with reference to the axis of the shaft 15, as shown in Fig. 5, in order to speed the lateral movement of the tomato material in the cylinder, from the hopper in towards the discharge end. This construction causes the cores and skins in the tomato material to be fed through the machine and discharged through the outlet 36 instead of the same being forced through the screen. It also enables the tomato material to be forced rather rapidly and quickly through the screen and in relatively larger lumps or form.

The lower cylinder in the machine herein shown is formed and constructed the same as the upper cylinder excepting the following features: The shaft 45 is mounted on upwardly curved bars 46 secured in the end frames of the machine, as shown. There is no hopper, but there is a conduit 40 leading from the drain pan or chamber under the upper cylinder for conveying the tomato material which comes from the upper cylinder to the lower cylinder. This material is free from cores and skins and contains a large amount of liquid so that there is no impeller 31 necessary in the lower cylinder. The screen in the lower cylinder has a relatively small mesh or has relatively small perforations as compared with the upper cylinder. As shown in Fig. 4, where it is desired to extract the seeds from the tomato material, these perforations should not permit the ready passage of seeds; and the beaters in the lower cylinder should, for such purpose, be inclined the same as the beaters in the upper cylinder. This is to facilitate the passage of the seeds through the machine and cause their discharge through the seed outlet 42 at the discharge end of the lower cylinder, and prevent the seeds from passing through the perforations in the lower cylinder. The fine tomato material that passes through the screen of the lower cylinder is collected in the drain pan or chamber 43 and is removed through the outlet 44 by any suitable means. Both the pans 25 and 43 have inclined bottoms as usual in machines of this general character.

The machine is driven through power coming through the pulleys 50 on the shaft 45 extending through the lower cylinder and power is transmitted from that shaft to shaft 15 to a belt 51 passing over pulleys on said shafts.

While this machine has been invented and manufactured particularly for the purpose of extracting seeds in tomatoes and the like, at the same time and by the same machine that pulps or otherwise treats the same, the invention is not limited to such use. If it is not desired to extract the seeds, the beaters need not be inclined, nor need the perforations be as small as the seeds, although for producing fine tomato material, said perforations will have to be relatively small.

If it be desired to make catsup or tomato soup material or other very liquid form, the perforations in the top cylinder are preferably made smaller than that shown in the drawings herein, that is, about six one-hundredths of an inch in diameter or about the same as the perforations in the lower cylinder shown herein and the bottom cylinder for making catsup or soup has perforations still smaller, that is, preferably about twenty seven-thousandths of an inch in diameter.

The production of seeds from tomatoes and the like is a large industry and heretofore it has been done by machine distinct and seperate from the pulping machines. The seeds separated are passed out through the discharge spout 42 and subsequently are washed and cleaned and prepared for the market to be sold for seeding purposes.

Where the only object of the machine described herein is to produce fine material from the tomatoes, that is done hereby much more satisfactorily and rapidly than can be done by a single machine. For in producing such material, it is necessary to have screens with relatively small mesh or perforations and when a single machine of such construction would be used, too much valuable material passes out at the discharge end of the machine and is wasted and lost.

The invention claimed is:

1. A machine for treating tomatoes and the like, which includes two horizontal beating cylinders, one below the other, the lower cylinder having perforations in the wall thereof smaller than those in the upper cylinder, a conduit for conveying material from one of said cylinders to the other by gravity, revoluable paddles in each of said cylinders, each cylinder and paddle being arranged to rapidly move the material through the cylinder so that the coarse part thereof will be discharged at the end of the cylinder and the finer liquid portion thereof will be discharged through the perforations of the cylinders, the paddles in the upper cylinder being spaced farther from the perforated cylinders than those in the lower cylinder.

2. A machine for treating tomatoes and the like, which includes a plurality of horizontal beating cylinders, one below the other, and the perforations in the lower cylinder being smaller than those in the upper cylinder, a shaft extending centrally and longitudinally through each cylinder, and paddles on each shaft and spaced away from the cylinder and inclined with relation to the axis of the shaft, the paddles in the upper cylinder being spaced farther from the perforated cylinders than those in the lower cylinder, substantially as set forth.

3. A machine for treating tomatoes and the like, which includes horizontal beating cylinders, one below the other, the lower cylinder having perforations smaller than those in the upper cylinder, a conduit for conveying material from the upper cylinder to the lower cylinder, and revoluble paddles in each of said cylinders inclined in relation to the axis of the cylinder and located adjacent the wall of the cylinder, the paddle in the upper cylinder being farther away from the wall of the cylinder than the paddles in the lower cylinder, substantially as set forth.

In witness whereof, I have hereunto affixed my signature.

JAMES F. LINDLEY.